(12) United States Patent
Martin

(10) Patent No.: US 7,776,174 B2
(45) Date of Patent: Aug. 17, 2010

(54) EMBOSSED HEADLINER AND METHOD OF MAKING SAME

(75) Inventor: James Noel Martin, Perry, MI (US)

(73) Assignee: Intier Automotive Inc., Newmarket (CA)

( * ) Notice: Subject to any disclaimer, the term of this patent is extended or adjusted under 35 U.S.C. 154(b) by 0 days.

(21) Appl. No.: 12/472,131

(22) Filed: May 26, 2009

(65) Prior Publication Data

US 2009/0229741 A1    Sep. 17, 2009

Related U.S. Application Data

(62) Division of application No. 11/107,589, filed on Apr. 15, 2005, now abandoned.

(60) Provisional application No. 60/521,401, filed on Apr. 19, 2004.

(51) Int. Cl.
B32B 27/00 (2006.01)
B32B 37/00 (2006.01)
B29C 44/06 (2006.01)

(52) U.S. Cl. .................. 156/242; 156/245; 264/45.1; 264/46.4; 264/241

(58) Field of Classification Search ............ 156/242, 156/245; 264/45.1, 45.2, 46.4, 241, 259
See application file for complete search history.

(56) References Cited

U.S. PATENT DOCUMENTS

| 3,446,685 A | 5/1969 | Goldstone et al. |
| 3,607,341 A | 9/1971 | Goins et al. |
| 3,852,146 A | 12/1974 | Squier et al. |
| 3,867,240 A | 2/1975 | Doerfling |
| 3,936,554 A | 2/1976 | Squier |
| 3,943,018 A | 3/1976 | Petry et al. |
| 3,959,434 A | 5/1976 | Squier |
| 3,966,526 A | 6/1976 | Doerfling |
| 3,979,487 A | 9/1976 | Squier et al. |
| 4,073,535 A | 2/1978 | Alfter et al. |
| 4,172,918 A | 10/1979 | Doerer |
| 4,198,448 A | 4/1980 | Kauffman et al. |
| 4,409,275 A | 10/1983 | Samowich |
| 4,454,187 A | 6/1984 | Flowers et al. |
| 4,643,789 A | 2/1987 | Parker et al. |
| 4,734,147 A * | 3/1988 | Moore ................. 156/212 |
| 4,830,892 A | 5/1989 | Nussbaum |
| 5,448,028 A | 9/1995 | Filion et al. |
| 5,494,737 A | 2/1996 | Sakai et al. |
| 5,509,247 A | 4/1996 | Fortez et al. |
| 6,080,469 A | 6/2000 | Ozeki et al. |

(Continued)

FOREIGN PATENT DOCUMENTS

WO    WO-80/01550 A1    8/1980

(Continued)

Primary Examiner—Donald Loney
(74) Attorney, Agent, or Firm—Honigman Miller Schwartz and Cohn LLP

(57) ABSTRACT

An interior trim component, such as a headliner, includes a decorative covering, a substrate and a piece of a material, such as foam material, placed between the decorative covering and the substrate. After the molding process, the piece of material expands due to its resiliency to form a raised relief in the decorative covering, thereby providing a headliner with an embellished appearance. The method of manufacturing the embossed headliner requires no special tooling and is very cost effective.

3 Claims, 2 Drawing Sheets

U.S. PATENT DOCUMENTS

| | | |
|---|---|---|
| 6,581,311 B1 | 6/2003 | Davey et al. |
| 6,749,794 B2 | 6/2004 | Spengler |
| 2003/0030188 A1 | 2/2003 | Spengler |
| 2003/0052430 A1 | 3/2003 | Hashiba |
| 2003/0124314 A1 | 7/2003 | Michael et al. |
| 2003/0207077 A1 | 11/2003 | Riha et al. |
| 2004/0216949 A1 | 11/2004 | Thompson et al. |

FOREIGN PATENT DOCUMENTS

| | | |
|---|---|---|
| WO | WO-00/44561 | 8/2000 |
| WO | WO-01/54949 A1 | 8/2001 |
| WO | WO-03/057466 A2 | 7/2003 |
| WO | WO-2004/098952 A2 | 11/2004 |

* cited by examiner

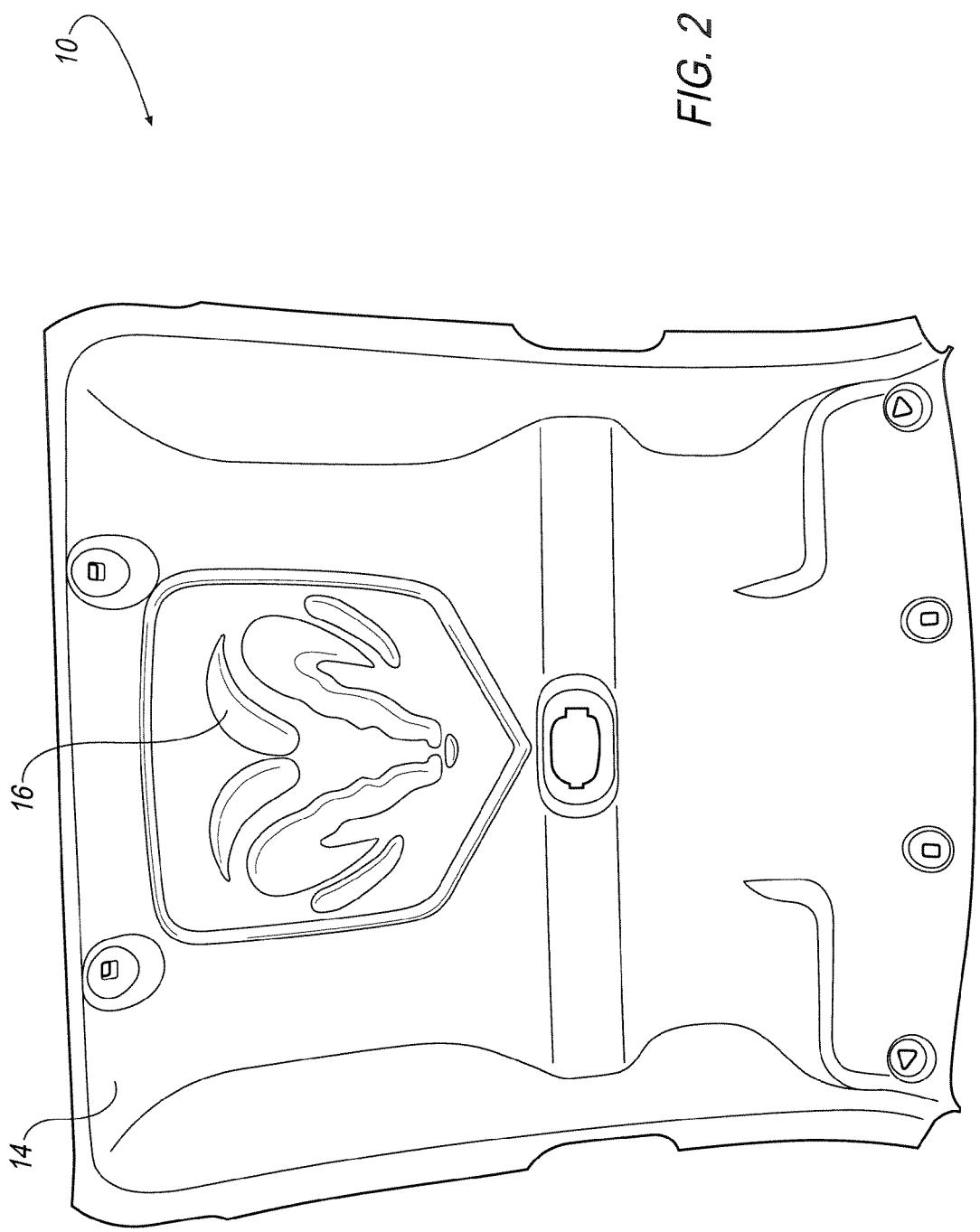

ically *c*

EMBOSSED HEADLINER AND METHOD OF MAKING SAME

CROSS REFERENCE TO RELATED APPLICATIONS

This application is a division application of U.S. Ser. No. 11/107,589 filed on Apr. 15, 2005 now abandoned which claims priority to U.S. provisional application 60/521,401, filed on Apr. 19, 2004, which is incorporated herein by reference in its entirety.

BACKGROUND OF THE INVENTION

1. Field of the Invention

The invention relates in general to an interior trim component and in particular to an embossed headliner with raised indicia.

2. Description of the Related Art

Currently, headliners are very plain in appearance. Thus, there is a need to provide a low cost effective method of enhancing the appearance of a conventional headliner.

SUMMARY OF THE INVENTION

The inventor has recognized these and other problems associated with conventional headliners and has developed a low cost effective method of enhancing the appearance of a conventional headliner.

According to the invention, a headliner comprises a decorative covering, a substrate, and a piece of material placed between the decorative covering and the substrate, wherein the piece of material provides a raised relief in the decorative covering, thereby providing an embossed appearance to the headliner.

According to another aspect of the invention, a method comprises the steps of:

placing a substrate onto a mold tool;

placing a piece of material at a desired location on the substrate;

placing a decorative covering on the substrate and the piece of material; and bonding the decorative covering to the substrate in a mold tool, whereby the piece of material provides a raised relief in the decorative covering, thereby providing an embossed appearance to the headliner.

BRIEF DESCRIPTION OF THE DRAWINGS

In the drawings:

FIG. 2 shows a perspective view of the embossed headliner according to the invention.

DESCRIPTION OF THE PREFERRED EMBODIMENT

Figure 1:
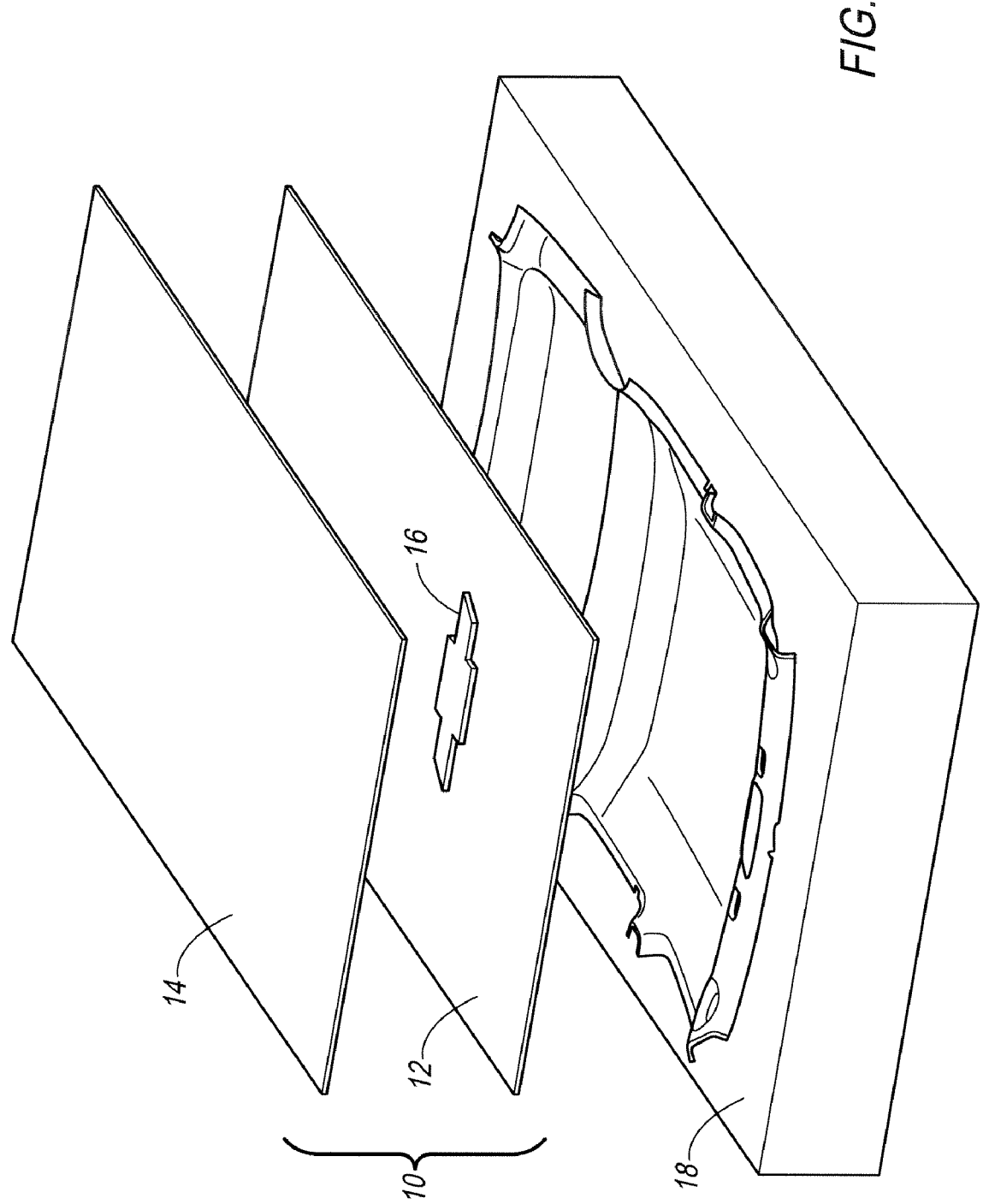
FIG. 1 shows an exploded view of an embossed headliner and the method of making same according to an embodiment of the invention.

Referring now to FIG. 1, an interior trim component 10, such as a headliner, is shown according to an embodiment of the invention. Although the headliner 10 may include other layers of material, the headliner 10 in the illustrated embodiment includes a substrate 12 and a decorative covering 14. In addition, the headliner 10 of the invention includes a piece of material 16 placed between the substrate 12 and the decorative covering 14.

The substrate 12 is made of a polyurethane composite material and has a thickness of between about 3 mm and 14 mm. The decorative covering 14 is made of a material, such as fabric with or without a foam backing, a knit material, a non-woven material, or the like. For example, the decorative covering 14 may have a thickness of about 4 mm. The decorative covering 14 forms what is commonly known as a Class "A" surface of the headliner 10.

One aspect of the invention is that the piece of material 16 can be formed to any desirable contour, such as a logo, a symbol, an emblem, or other indicia. The piece of material 16 can be cut or trimmed to the desired shape by water jet, steel rule die, or any other commonly known process. The material properties of the piece of material 16, such as hardness, thickness, resiliency, or the like, can vary depending on the desired finished appearance of the headliner 10. For example, the piece of material 16 may comprise a foam material having a thickness of between about 4 mm and 20 mm.

A method of manufacturing the headliner 10 will now be described. First, the substrate 12 is placed on a mold tool 18. Next, the piece of material 16 is placed at a desired location on the substrate 12. Then, the decorative covering 14 is placed on the substrate 12 and the piece of material 16 and the bonding operation is performed. After the headliner 10 is demolded from the mold tool 18, the piece of material 16 expands due to its resiliency and produces a raised relief in the decorative covering 14 with soft edges creating an embellished appearance to the headliner 10, as shown in FIG. 2.

As described above, the invention provides a cost effective method of manufacturing an interior trim component, such as a headliner, with an embellished appearance because the only additional tooling required is the tooling to cut the piece of material into the desired shape.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method for forming a vehicular trim component with a mold tool, the method comprising the steps of:

providing a substrate onto a mold tool;

providing a unit of resilient, expandable, contoured material adjacent the substrate, wherein a surface of the unit of resilient, expandable, contoured material, opposite from the substrate, includes an embellishment, and wherein a surface of the embellishment is elevated from a surface that circumscribes the embellishment;

placing a decorative covering adjacent the surface of the unit of resilient, expandable, contoured material that includes the embellishment;

bonding the decorative covering to the substrate to define the interior trim component;

subsequent to the bonding step, demolding the vehicular trim component to allow the unit of expandably resilient, contoured material to expand such that the embellishment defines a raised relief in the decorative covering.

2. The method according to claim 1, wherein the unit of resilient, expandable, contoured material includes a foam material.

3. The method according to claim 1, wherein the interior trim component defines, at least in part, a headliner.

* * * * *